United States Patent
Kessel (10) Patent No.: US 10,218,943 B2
(45) Date of Patent: Feb. 26, 2019

(54) METHOD AND APPARATUS FOR TRIGGERING MULTIPLE DATA RECORDING DEVICES

(71) Applicant: L-3 COMMUNICATIONS CORPORATION, New York, NY (US)

(72) Inventor: Kurt Kessel, Altamonte Springs, FL (US)

(73) Assignee: L3 Technologies, Inc., New York, NY (US)

( * ) Notice: Subject to any disclaimer, the term of this patent is extended or adjusted under 35 U.S.C. 154(b) by 71 days.

(21) Appl. No.: 15/447,332

(22) Filed: Mar. 2, 2017

(65) Prior Publication Data

US 2018/0255277 A1 Sep. 6, 2018

(51) Int. Cl.
*H04N 7/18* (2006.01)
*H04N 5/232* (2006.01)
*H04W 4/80* (2018.01)

(52) U.S. Cl.
CPC ......... *H04N 7/188* (2013.01); *H04N 5/23206* (2013.01); *H04N 7/181* (2013.01); *H04W 4/80* (2018.02)

(58) Field of Classification Search
CPC .... H04N 7/188; H04N 5/23206; H04N 7/181; H04W 4/80
See application file for complete search history.

(56) References Cited

U.S. PATENT DOCUMENTS 8,781,292 B1 7/2014 Ross et al.
2016/0233946 A1* 8/2016 Wengrovitz ............ H04W 4/90

* cited by examiner

*Primary Examiner* — Hunter B Lonsberry
(74) *Attorney, Agent, or Firm* — Gardner Groff Greenwald Villanueva, P.C.

(57) ABSTRACT

A method and apparatus for controlling mobile/remote recording devices in a decentralized manner and auto-triggering such devices in the event that one of them is operating in a recording mode. In this way, other such devices can be made to support and augment the recording in an automated way, without requiring an operator to manually turn on his or her devices and without requiring a central controller to control far-flung devices.

26 Claims, 5 Drawing Sheets

METHOD AND APPARATUS FOR TRIGGERING MULTIPLE DATA RECORDING DEVICES

TECHNICAL FIELD

The present invention relates to mobile and/or portable recording or sensing devices and in particular to controlling such devices.

SUMMARY OF THE INVENTION

Briefly described, the invention relates generally to controlling mobile or remote recording devices in a decentralized manner and auto-triggering such devices in the event that one of them is operating in a recording mode. In this way, other such devices can be made to support and augment the recording in an automated way, without requiring an operator to manually turn on his or her devices or without requiring a central controller to control far-flung devices.

In a first example form, the invention relates to a method of controlling multiple mobile vision camera systems for first responders, including body cameras and vehicle cameras, the body cameras and the vehicle cameras being capable of both recording and non-recording modes. The method includes the step of, responsive to whether a body camera and a vehicle camera are in recording or non-recording mode, sending a triggering signal to other nearby body cameras and/or vehicle cameras to trigger the other cameras to also begin operating in recording mode.

Preferably, the triggering signal is communicated from one of the body camera or the vehicle camera to the other nearby body camera(s) and/or the other nearby vehicle camera(s) via wireless communication. More preferably, the triggering signal is communicated from a body camera or a vehicle camera to the other nearby body camera(s) or the other nearby vehicle camera(s) via Bluetooth® wireless communication.

Most preferably, the triggering signal is communicated in daisy chain fashion from one body camera or a vehicle camera to another nearby body camera or the other nearby vehicle camera via Bluetooth® wireless communication.

Optionally, the triggering signal is communicated in daisy chain fashion for a limited number of retransmissions. In one example manner, the triggering signal is communicated in daisy chain fashion no more than 10 times, such that the geographic scope of the triggering is limited.

Preferably, the triggering signal is communicated from a body camera or a vehicle camera to the other nearby body camera(s) or the other nearby vehicle camera(s) rather than from a central controller.

Optionally, the body cameras and vehicle cameras are associated with an agency and the triggering signal is communicated from a body camera or a vehicle camera only to the other nearby body camera(s) or the other nearby vehicle camera(s) associated with that agency. Also optionally, the body cameras and vehicle cameras are associated with a first agency and wherein the triggering signal is communicated from a body camera or a vehicle camera to the other nearby body camera(s) or the other nearby vehicle camera(s) associated with that agency and to other nearby body camera(s) or the other nearby vehicle camera(s) associated with a different agency.

In another example form, the invention relates to a method of controlling multiple mobile recording systems, such as body cameras, vehicle cameras, audio recorders, sniffers, etc, in which the mobile recording systems being capable of both recording and non-recording modes. The method includes being responsive to whether a mobile recording system is in recording or non-recording mode, and when one of the mobile recording systems is in recording mode, sending a triggering signal from that mobile recording system to other nearby mobile recording systems to trigger the other mobile recording systems to also begin operating in recording mode.

Preferably, the triggering signal is communicated from one of the mobile recording systems to the other nearby mobile recording systems via wireless communication via Bluetooth® wireless communication. Preferably, at least one of the mobile recording systems comprises a mobile video recording system. Preferably, at least one of the mobile recording systems comprises a wearable body video camera. Preferably, at least one of the mobile recording systems comprises a vehicle-mounted video camera. Also preferably, the mobile recording systems comprise recording systems for first responders.

Optionally, the triggering signal is communicated in daisy chain fashion from one mobile recording system to another nearby mobile recording system in daisy chain fashion for a limited number of retransmissions. Preferably, the triggering signal is communicated in daisy chain fashion no more than 10 times, such that the geographic scope of the triggering is limited.

Advantageously, the triggering signal is communicated from a body camera or a vehicle camera to other nearby body camera(s) or the other nearby vehicle camera(s) rather than from a central controller.

Optionally, the mobile recording systems comprise body cameras and vehicle cameras associated with an agency and wherein the triggering signal is communicated from a body camera or a vehicle camera only to the other nearby body camera(s) or the other nearby vehicle camera(s) associated with that agency. Also, the triggering signal can be communicated to other nearby body camera(s) or the other nearby vehicle camera(s) associated with a different agency.

In another example form, the invention relates to a mobile recording system for first responders including a recording apparatus for recording events or data and operable in a recording mode and a non-recording mode. The mobile recording system also includes a controller which is operable to send a triggering signal to other nearby mobile recording systems when the recording apparatus is in recording mode to trigger the other mobile recording systems to also begin operating in recording mode.

DETAILED DESCRIPTION OF EXAMPLE EMBODIMENTS

The invention relates generally to controlling mobile or remote recording devices in a decentralized manner and auto-triggering such devices in the event that one of them is operating in a recording mode. In this way, other such devices can be made to support and augment the recording in an automated way, without requiring an operator to manually turn on his or her devices or without requiring a central controller to control far-flung devices.

Figure 1:
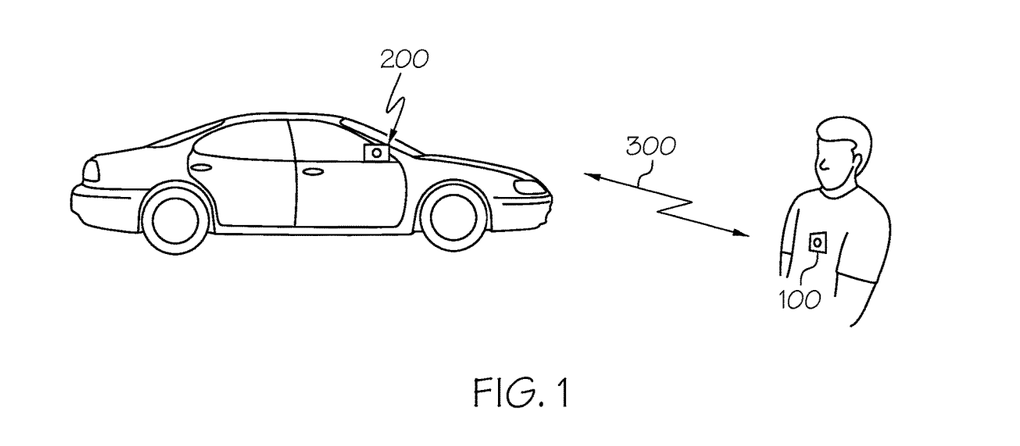
FIG. 1 is a schematic, functional diagram depicting a method and system according to a preferred form of the present invention and depicts a body-mounted recorder and a vehicle-mounted recorder.

FIG. 1 is a schematic, functional diagram depicting a method and system according to a preferred form of the present invention and depicts a body-mounted recorder 100 and a vehicle-mounted recorder 200. The body-mounted recorder 100 and the vehicle-mounted recorder 200 are linked by a short-distance wireless communication link 300, such as by IEEE 802.15.1, otherwise known as BlueTooth®. Such a short-distance communication link has an effective range of tens of feet, such as 30 feet or 50 feet or so. Other communication link technologies can be employed, as desired and as new technologies come into being.

In a first example form, the invention relates to a method of controlling multiple mobile vision camera systems for first responders, including a body camera 100 and a vehicle camera 20, with the body cameras and the vehicle cameras being capable of both recording and non-recording modes. Preferably, if the body camera 100 is in record mode, it sends a trigger signal to the vehicle camera 200 to also go into record mode via the communication link 300. Similarly, if the vehicle camera 200 is in record mode, it sends a trigger signal to the body camera 100 to also go into record mode via the communication link 300.

Figure 2A:
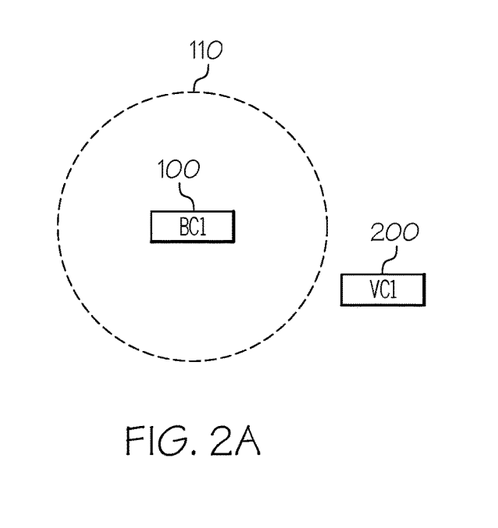
FIGS. 2A and 2B are schematic, functional diagrams of the method and system of FIG. 1, illustrating how as additional recording devices come into a communication zone, they are activated (triggered) to record.
Figure 2B:
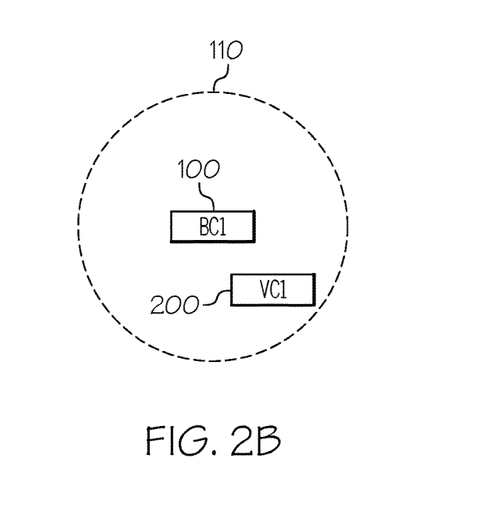

As depicted in FIG. 2A, these cameras have a finite, relatively short effective communication range. As shown illustratively in FIG. 2A, the body camera 100 (designated here as BC1) has an effective range denoted by dashed circle 110. Depending upon the particular BlueTooth® technology employed, this effective range can be various dimensions, such as 30 feet or 300 feet. Note also that as shown in this figure, the vehicle camera (VC1) 200 is outside of the range 110 of communication from the body camera (BC1) 100. As depicted in FIG. 2B, either the vehicle camera (VC1) 200 has moved inside the range 110 of communication from the body camera (BC1) 100 or the body camera (BC1) 100 has moved closer to the vehicle camera (VC1) 200 so that the vehicle camera 200 is within the communication range 110 of the body camera. Once the two are in communication range, the first one to have been recording (the body camera in this example) sends a triggering signal to the second one to cause it to also start recording. Thus, they are then both recording events.

Figure 2C:
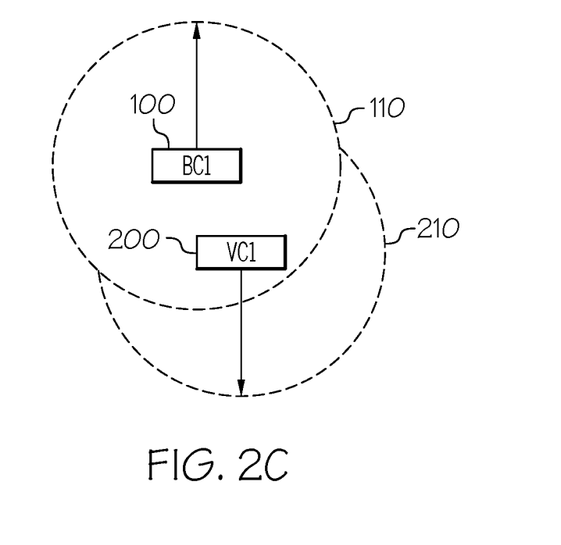
FIGS. 2C and 2D are schematic, functional diagrams of the method and system of FIG. 1, illustrating how as additional recording devices come into a communication zone, they are activated (triggered) to record in a daisy-chain triggering arrangement.

As shown in FIG. 2C, once the two cameras (body camera 100 and vehicle camera 200) are both operating in recording mode, the communication range of the two is combined, as the body camera 100 and the vehicle camera 200 are now both utilizing their respective communication ranges to try to trigger additional cameras that are in or come into range. Thus, the total coverage/effective range of the two cameras combined is 110 and 210 combined.

Figure 2D:
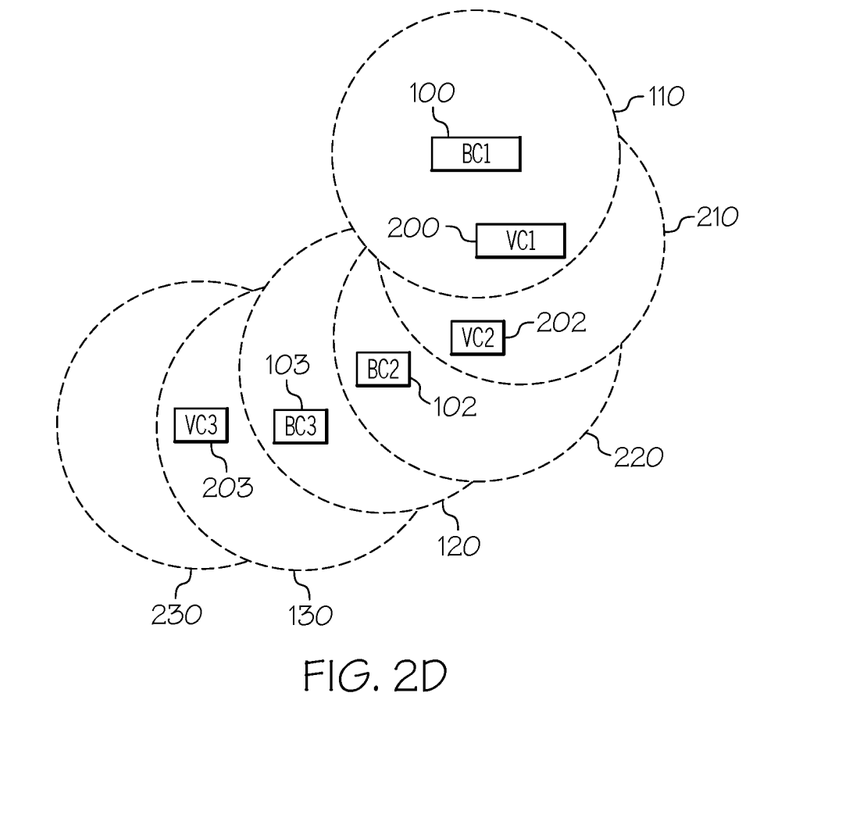

FIG. 2D shows a schematic, functional diagram of the method and system of FIG. 1, illustrating how as additional recording devices come into a communication zone, they are activated (triggered) to record in a daisy-chain triggering arrangement. Thus, as shown in this figure, as additional body cameras (102, 103) and additional vehicle cameras (202 and 203) come into communication range of other devices already in recording mode, they are triggered to begin recording and to in turn search for and trigger additional recording devices. Thus, the recording devices in a larger and larger area are triggered to begin recording. This daisy-chaining can be left to go on ad infinitum or can be controlled to be limited to a certain number of daisy chains. For example, this can be limited to 10 links in the daisy chain. Other limits on the daisy chain can be utilized, as desired.

Figure 3:
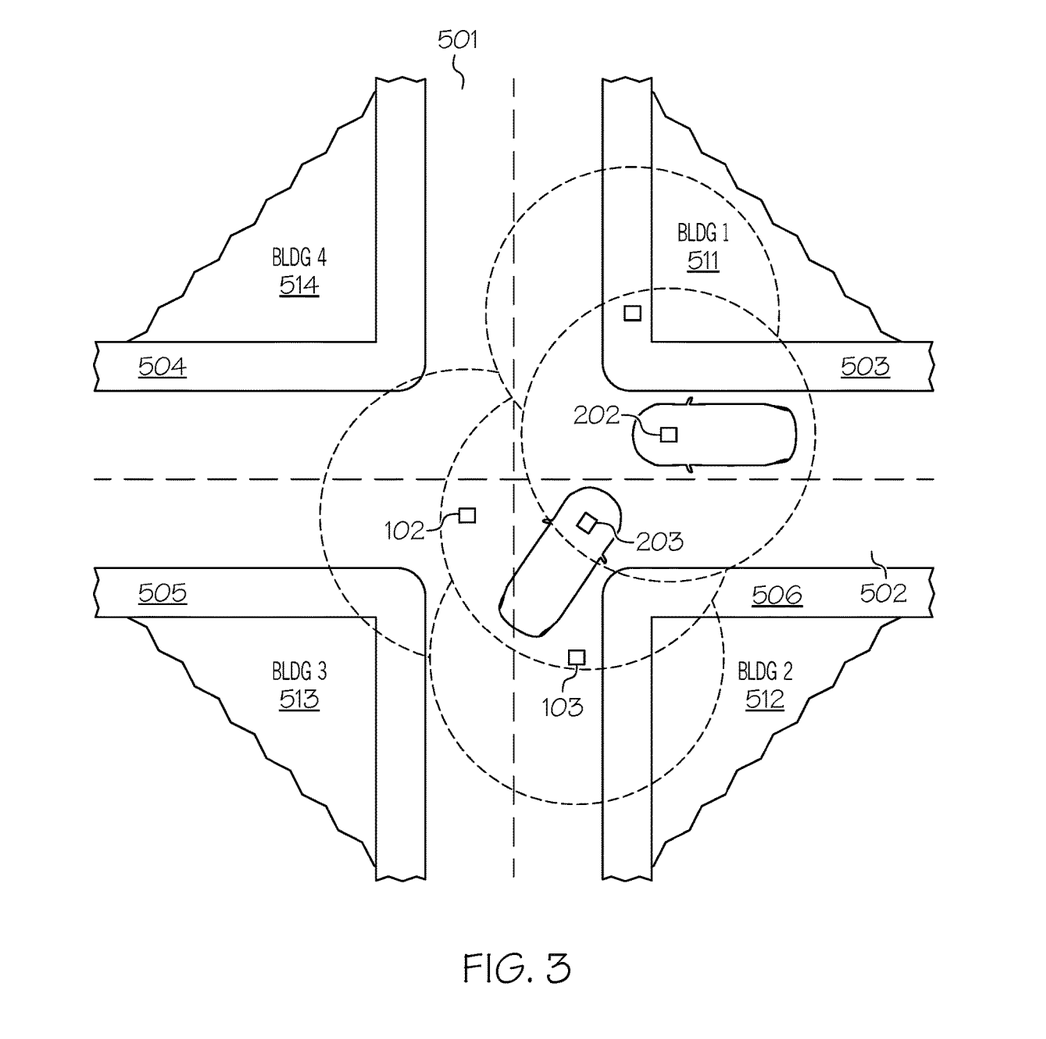
FIG. 3 is a schematic, functional diagram of the method and system of FIG. 1, illustrating how as additional recording devices come into a traffic intersection of interest, they are activated (triggered) to record in a daisy-chain triggering arrangement, spreading the zone of recording coverage over the scene.

FIG. 3 is a schematic, functional diagram of the method and system of FIG. 1, illustrating how as additional recording devices come into a traffic intersection of interest, they are activated (triggered) to record in a daisy-chain triggering arrangement, spreading the zone of recording coverage over the scene. In this way, the streets (501, 502), sidewalks (503-506), and buildings (511-514) at an intersection can be effectively recorded by as many recording devices as are brought into the area by first responders. As shown in this example, vehicle cameras 202, 203 and body cameras 102, 103 are all caused to be recording, providing good recording coverage for the scene of interest.

The auto-triggering of cameras can be implemented to only auto-trigger recording devices belonging to a particular agency or a particular department or unit within an agency. Moreover, while the invention has been described in connection with first responder camera recorders (such as vehicle and body cameras), those skilled in the art will quickly appreciate that the invention also relates to fixed recording devices, such as security cameras mounted on poles, buildings and other structures. Further, while cameras are a good application of the present invention, other types or sensors or recording devices can also be controlled in this way. Examples of such include environmental measurements, such as temperature, wind, pressure, etc. This technology also has ready application in industrial facilities.

Figure 4:
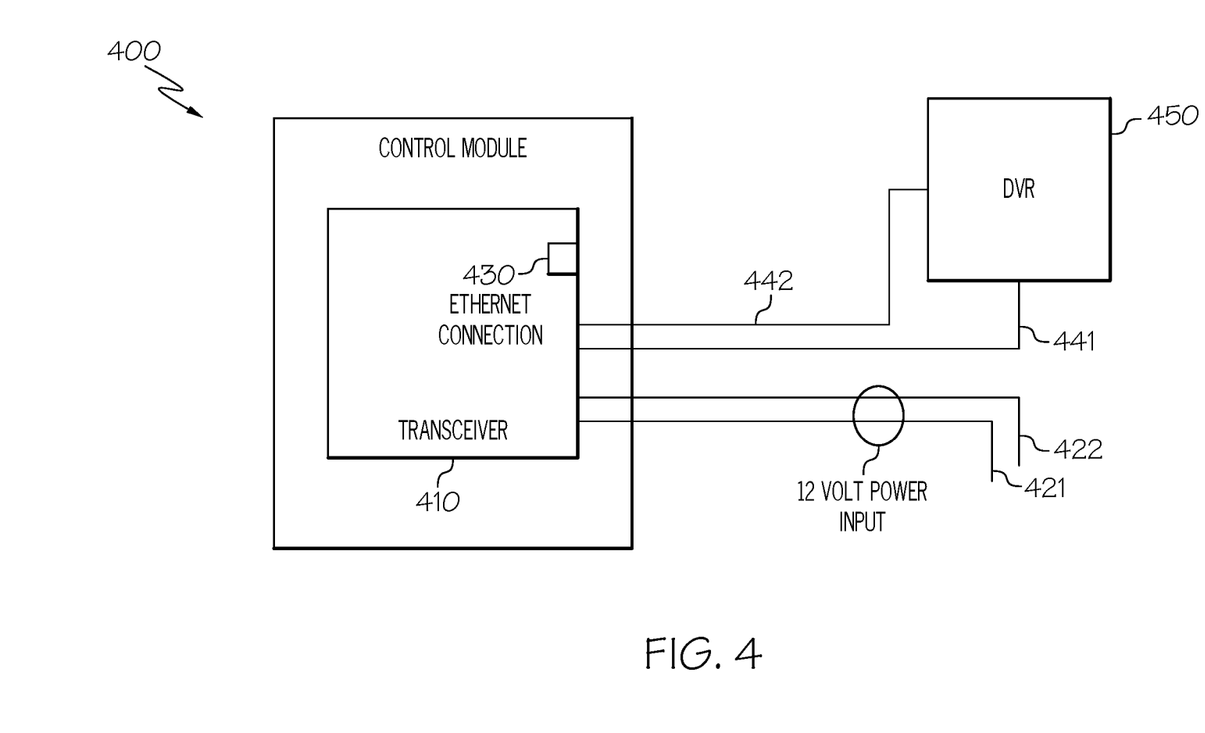
FIG. 4 is a schematic, functional diagram depicting a system according to a preferred form of the present invention and depicts a recorder with a control module for transmitting a triggering signal to nearby recorders when the first recorder is operating in recording mode.

FIG. 4 is a schematic, functional diagram depicting a system according to a preferred form of the present invention and depicts the hardware aspect thereof, in particular a recorder with a control module for transmitting a triggering signal to nearby recorders when the first recorder is operating in recording mode. As shown herein, the control module 400 includes a transceiver 410, power inputs 421 and 422 to deliver electric power (such as 12 VDC, as depicted herein for an example form of the present invention). The control module 400 also includes an Ethernet connection 430, and control lines 441, 442 for sending and receiving trigger signals from the transceiver 410 to and from a recorder 450 (here in this example a DVR). Thus, the transceiver 430 of the control module can receive a triggering signal via radio (such as by Bluetooth or NFC) and then can send out a triggering signal to its associated monitoring device (again, here the example shown is a DVR 450). This relayed message typically will be hard-wired for ease of communication and low-cost, but those skilled in the art will recognize that this relayed communication can also be sent wirelessly.

Figure 5:
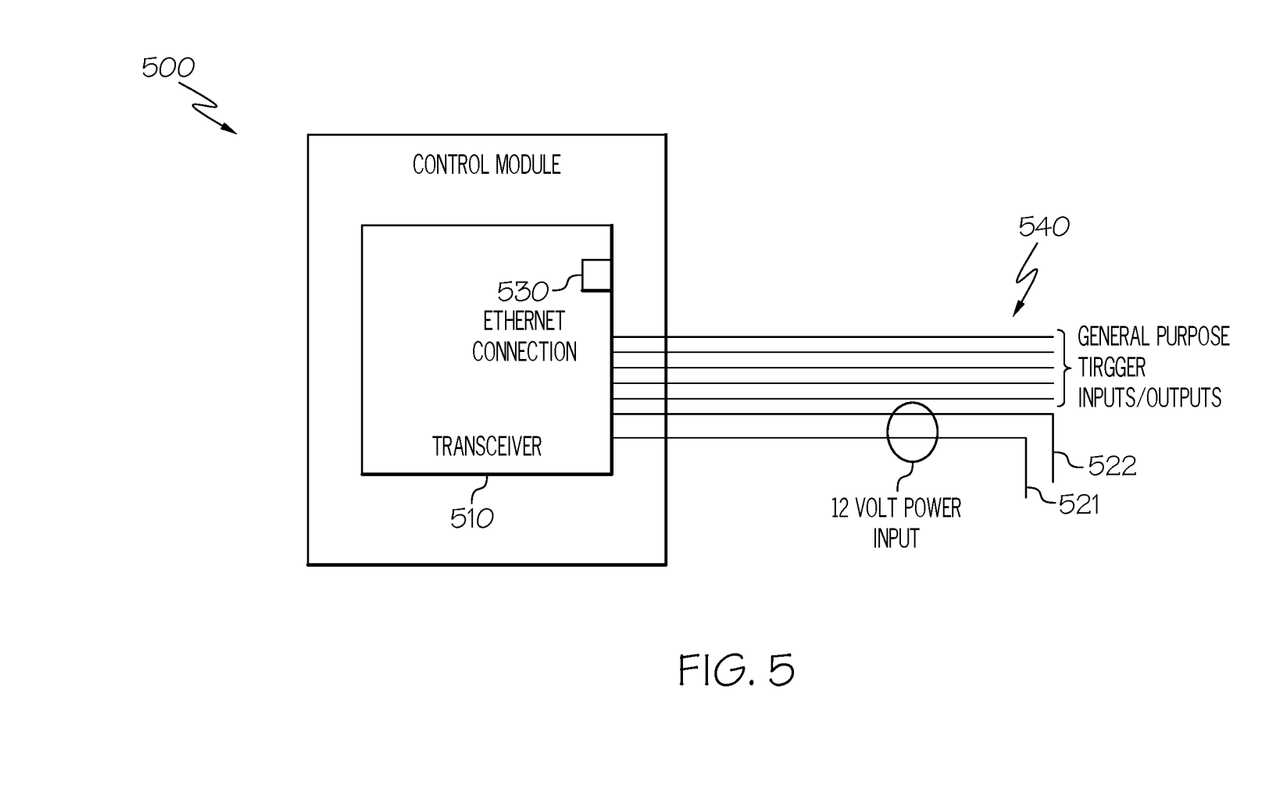
FIG. 5 is a schematic, functional diagram depicting a system according to a preferred form of the present invention and depicts the hardware aspect thereof, in particular a control module for transmitting a triggering signal to nearby sensors or recorders.

FIG. 5 is a schematic, functional diagram depicting a system according to a preferred form of the present invention and depicts the hardware aspect thereof, in particular a control module for transmitting a triggering signal to nearby sensors or recorders. As shown herein, the control module 500 includes a transceiver 510, power inputs 521 and 522 to deliver electric power (such as 12 VDC, as depicted herein for an example form of the present invention). The control module 500 also includes an Ethernet connection 530, and control lines 540 in the form of an electrical bus for sending and receiving trigger signals from the transceiver 510 to and from an external device, such as a sensor, monitoring device, recorder, etc. Thus, the transceiver 530 of the control module can receive a triggering signal via radio (such as by Bluetooth or NFC) and then can send out a triggering signal to its associated monitoring device. Again, this relayed message typically will be hard-wired for ease of communication and low-cost, but those skilled in the art will recognize that this relayed communication can also be sent wirelessly.

Technology Background

The present invention utilizes existing short-distance communication technology to trigger adjacent/nearby devices to also begin recording (other such communication technology can be utilized or brought to bear on this as such technologies develop). One such communication protocol for accomplishing this is Bluetooth® wireless communication (point to point, from one device to another). Generally speaking, Bluetooth® is a wireless technology standard for exchanging data over short distances (using short-wavelength UHF radio waves in the ISM band from 2.4 to 2.485 GHz) from fixed and mobile devices, and building personal area networks (PANs). Bluetooth® is managed by the Bluetooth Special Interest Group (SIG), which has more than 30,000 member companies in the areas of telecommunication, computing, networking, and consumer electronics.[6] The IEEE standardized Bluetooth as IEEE 802.15.1 Generally speaking, Bluetooth® doesn't have a broadcast mode for broadcasting to a wide area or a large number of devices at once. According to Bluetooth® specs, apparently Bluetooth® can also be operated in pairless mode. To send data over an encrypted channel may require paring, so the protocol can be encrypted if there is no pairing. One advantage to this approach is that it allows all triggering to be accomplished via Bluetooth® and does not require a Wi-Fi device at all.

Auto-Triggering of Nearby Recording Devices

It is desired that in a first responder application, such as body-mounted cameras and vehicle-mounted cameras, that the cameras that come upon an active scene be auto-triggered by a camera that is already on the scene and is already recording. Thus, it is desired that a body-mounted camera, when recording, auto-triggers its associated vehicle-mounted camera, and vice-versa. Thus, whichever of the pair of body cam and vehicle cam starts recording first, it auto-triggers the other to begin recording also. Further, according to the present invention, these two cameras also are configured and adapted to auto-trigger any other body or vehicle cameras that venture into the area. That "auto-trigger area" is defined by the distance (range) of the effective radio transmission of the body camera and the vehicle camera when communicating via short-distance communication protocol (such as by Bluetooth® ranges). In using Bluetooth® communication, there are at least two effective ranges, one of about 30 feet using the so-called Low-Energy aspect of Bluetooth® and one of about 300 feet using the so-called Classic aspect of Bluetooth®.

It is desired that any mobile recording device that goes into record mode triggers any other mobile recording device in the immediate area to go into record mode also. These associated recordings, such as videos, from all the devices can be collected together for a given event. In case this behavior is not desired, a configuration setting on a device would allow the device to be configured to not be auto-triggered by nearby mobile recording devices.

As soon as a mobile (or remote) recording device goes into record mode, the record announcement service starts sending messages on a periodic basis to all devices it "sees" (those in close enough proximity to be in communication therewith). This time period can be configurable. For example, it could be once per 30 seconds or less or more frequently as desired, such as for minimizing or managing power consumption. Optionally, the service can encrypt the message for each device using the receiving device's MAC address as the salt. A block-type standard encryption algorithm can be used, although other encryption protocols can be employed as desired.

The communication packet sent from one mobile recording device to another nearby mobile recording device can contain information to facilitate a daisy-chain linking of the mobile recording devices. Thus, for example the communication packet can contain: the serial number of the sending device serial number; a recording date/time stamp; command and/or metadata; and a checksum for verifying error-free communication. Preferably, as soon as the receiving device receives the packet, it is decrypted and the receiving device verifies that the packet is genuine. This verified triggering signal causes the receiving device to go into record mode. Optionally, from that time forward, that receiving device itself can start sending record announcements (triggering signal) just like above. Thus, in this way a periodic set of record packets can be transmitted. A mobile recording device that is triggered into record mode in this way would record (note internally) the "trigger reason" as being the particular device from which it received the message. Additionally, any mobile recording device that receives a recording message would store the information from the sending device. All subsequent recording packets from any mobile recording device would be ignored. Ultimately, the device recording video would have a list of devices that it sensed were also recording during its recording period. This information would be stored as header metadata with the video for back office use by the agency deploying/employing the mobile recording devices.

Turning Off Mobile Recording Devices

Preferably, once a recording device stops recording, it should not go back into record mode because of any remote devices that are still recording the same incident. As noted, the subject recording device optionally can keep a list of the messages sent from other devices accumulated during recording. So when the officer stopped his recording, the previous incident will be ignored. Thus, optionally a record message matching a saved message would be ignored and not be able to put the device back in record mode. Of course, any new or previously unseen record message received would start a new recording. This list would be purged during docking and upload to keep it from growing too large.

In a first example form, the invention relates to a method of controlling multiple mobile vision camera systems for first responders, including body cameras and vehicle cameras, the body cameras and the vehicle cameras being capable of both recording and non-recording modes. The method includes the step of, responsive to whether a body camera and a vehicle camera are in recording or non-recording mode, sending a triggering signal to other nearby body cameras and/or vehicle cameras to trigger the other cameras to also begin operating in recording mode.

Preferably, the triggering signal is communicated from one of the body camera or the vehicle camera to the other nearby body camera(s) and/or the other nearby vehicle camera(s) via wireless communication. More preferably, the triggering signal is communicated from a body camera or a vehicle camera to the other nearby body camera(s) or the other nearby vehicle camera(s) via Bluetooth® wireless communication.

Most preferably, the triggering signal is communicated in daisy chain fashion from one body camera or a vehicle camera to another nearby body camera or the other nearby vehicle camera via Bluetooth® wireless communication.

Optionally, the triggering signal is communicated in daisy chain fashion for a limited number of retransmissions. In one example manner, the triggering signal is communicated in daisy chain fashion no more than 10 times, such that the geographic scope of the triggering is limited.

Preferably, the triggering signal is communicated from a body camera or a vehicle camera to the other nearby body camera(s) or the other nearby vehicle camera(s) rather than from a central controller.

Optionally, the body cameras and vehicle cameras are associated with an agency and the triggering signal is communicated from a body camera or a vehicle camera only to the other nearby body camera(s) or the other nearby vehicle camera(s) associated with that agency. Also optionally, the body cameras and vehicle cameras are associated with a first agency and wherein the triggering signal is communicated from a body camera or a vehicle camera to the other nearby body camera(s) or the other nearby vehicle camera(s) associated with that agency and to other nearby body camera(s) or the other nearby vehicle camera(s) associated with a different agency.

In another example form, the invention relates to a method of controlling multiple mobile recording systems, such as body cameras, vehicle cameras, audio recorders, sniffers, etc, in which the mobile recording systems being capable of both recording and non-recording modes. The method includes being responsive to whether a mobile recording system is in recording or non-recording mode, and when one of the mobile recording systems is in recording mode, sending a triggering signal from that mobile recording system to other nearby mobile recording systems to trigger the other mobile recording systems to also begin operating in recording mode.

Preferably, the triggering signal is communicated from one of the mobile recording systems to the other nearby mobile recording systems via wireless communication via Bluetooth® wireless communication. Preferably, at least one of the mobile recording systems comprises a mobile video recording system. Preferably, at least one of the mobile recording systems comprises a wearable body video camera. Preferably, at least one of the mobile recording systems comprises a vehicle-mounted video camera. Also preferably, the mobile recording systems comprise recording systems for first responders.

Optionally, the triggering signal is communicated in daisy chain fashion from one mobile recording system to another nearby mobile recording system in daisy chain fashion for a limited number of retransmissions. Preferably, the triggering signal is communicated in daisy chain fashion no more than 10 times, such that the geographic scope of the triggering is limited.

Advantageously, the triggering signal is communicated from a body camera or a vehicle camera to other nearby body camera(s) or the other nearby vehicle camera(s) rather than from a central controller.

Optionally, the mobile recording systems comprise body cameras and vehicle cameras associated with an agency and wherein the triggering signal is communicated from a body camera or a vehicle camera only to the other nearby body camera(s) or the other nearby vehicle camera(s) associated with that agency. Also, the triggering signal can be communicated to other nearby body camera(s) or the other nearby vehicle camera(s) associated with a different agency.

In another example form, the invention relates to a mobile recording system for first responders including a recording apparatus for recording events or data and operable in a recording mode and a non-recording mode. The mobile recording system also includes a controller which is operable to send a triggering signal to other nearby mobile recording systems when the recording apparatus is in recording mode to trigger the other mobile recording systems to also begin operating in recording mode.

While the invention has been shown and described in example embodiments, those skilled in the art will appreciate that the invention is not limited to the specific examples described herein and that many additions, deletions, and modifications can be made therein while remaining within the scope and spirit of the invention as set forth in the following claims.

What is claimed is:

1. A method of controlling multiple mobile vision camera systems for first responders, including body cameras and vehicle cameras, the body cameras and the vehicle cameras being capable of both recording and non-recording modes, the method comprising the steps of:
responsive to whether a body camera and/or a vehicle camera are in recording or non-recording mode, sending a triggering signal to other nearby body cameras and/or vehicle cameras to trigger the other cameras to also begin operating in recording mode, wherein the triggering signal is communicated in daisy chain fashion from one of the body camera or the vehicle camera to the other nearby body camera(s) and/or the other nearby vehicle camera(s) via Bluetooth® wireless communication.

2. A method as claimed in claim 1 wherein the triggering signal is communicated from a body camera or a vehicle camera to the other nearby body camera(s) or the other nearby vehicle camera(s) via Bluetooth® wireless communication.

3. A method as claimed in claim 1 wherein the triggering signal is communicated in daisy chain fashion for a limited number of retransmissions.

4. A method as claimed in claim 3 wherein the triggering signal is communicated in daisy chain fashion no more than 10 times, such that the geographic scope of the triggering is limited.

5. A method as claimed in claim 1 wherein the triggering signal is communicated from a body camera or a vehicle camera to the other nearby body camera(s) or the other nearby vehicle camera(s) rather than from a central controller.

6. A method as claimed in claim 1 wherein the body cameras and vehicle cameras are associated with an agency and wherein the triggering signal is communicated from a body camera or a vehicle camera only to the other nearby body camera(s) or the other nearby vehicle camera(s) associated with that agency.

7. A method as claimed in claim 1 wherein the body cameras and vehicle cameras are associated with a first agency and wherein the triggering signal is communicated from a body camera or a vehicle camera to the other nearby body camera(s) or the other nearby vehicle camera(s) associated with that agency and to other nearby body camera(s) or the other nearby vehicle camera(s) associated with a different agency.

8. A method of controlling multiple mobile recording systems, such as body cameras, vehicle cameras, audio recorders, sniffers, etc, the mobile recording systems being capable of both recording and non-recording modes, the method comprising the steps of:
responsive to whether a mobile recording system is in recording or non-recording mode, when one of the mobile recording systems is in recording mode, sending a triggering signal from that mobile recording system to other nearby mobile recording systems to trigger the other mobile recording systems to also begin operating in recording mode, wherein the triggering signal is communicated in daisy chain fashion from one mobile recording system to another nearby mobile recording system in daisy chain fashion for a limited number of retransmissions.

9. A method as claimed in claim 8 wherein the triggering signal is communicated from one of the mobile recording systems to the other nearby mobile recording systems via wireless communication via Bluetooth® wireless communication.

10. A method as claimed in claim 8 wherein at least one of the mobile recording systems comprises a mobile video recording system.

11. A method as claimed in claim 8 wherein at least one of the mobile recording systems comprises a wearable body video camera.

12. A method as claimed in claim 8 wherein at least one of the mobile recording systems comprises a vehicle-mounted video camera.

13. A method as claimed in claim 8 wherein the mobile recording systems comprise recording systems for first responders.

14. A method as claimed in claim 8 wherein the triggering signal is communicated in daisy chain fashion no more than 10 times, such that the geographic scope of the triggering is limited.

15. A method as claimed in claim 8 wherein the triggering signal is communicated from a body camera or a vehicle camera to other nearby body camera(s) or the other nearby vehicle camera(s) rather than from a central controller.

16. A method as claimed in claim 8 wherein the mobile recording systems comprise body cameras and vehicle cameras associated with an agency and wherein the triggering signal is communicated from a body camera or a vehicle camera only to the other nearby body camera(s) or the other nearby vehicle camera(s) associated with that agency.

17. A method as claimed in claim 8 wherein the mobile recording systems comprise body cameras and vehicle cameras associated with a first agency and wherein the triggering signal is communicated from a body camera or a vehicle camera to the other nearby body camera(s) or the other nearby vehicle camera(s) associated with that agency and to other nearby body camera(s) or the other nearby vehicle camera(s) associated with a different agency.

18. A mobile recording system for first responders comprising:
a recording apparatus for recording events or data and operable in a recording mode and a non-recording mode; and
a controller operable to send a triggering signal to other nearby mobile recording systems when the recording apparatus is in recording mode to trigger the other mobile recording systems to also begin operating in recording mode, wherein the triggering signal is communicated in daisy chain fashion from one mobile recording system to another nearby mobile recording system via Bluetooth® wireless communication in daisy chain fashion for a limited number of retransmissions.

19. A mobile recording system as claimed in claim 18 wherein the triggering signal is communicated via wireless communication.

20. A mobile recording system as claimed in claim 18 wherein the triggering signal is communicated to a nearby body camera or a nearby vehicle camera via Bluetooth® wireless communication.

21. A mobile recording system as claimed in claim 18 wherein the recording apparatus comprises body camera.

22. A mobile recording system as claimed in claim 18 wherein the recording apparatus comprises a vehicle camera.

23. A mobile recording system as claimed in claim 18 wherein the triggering signal is communicated in daisy chain fashion from one mobile recording system to another nearby mobile recording system via Bluetooth® wireless communication.

24. A mobile recording system as claimed in claim 18 the triggering signal is communicated in daisy chain fashion no more than 10 times, such that the geographic scope of the triggering is limited.

25. A mobile recording system as claimed in claim 18 wherein recording apparatuses are associated with an agency and wherein the triggering signal is communicated from a body camera or a vehicle camera only to the other nearby body camera(s) or the other nearby vehicle camera(s) associated with that agency.

26. A mobile recording system as claimed in claim 18 wherein recording apparatuses are associated with an agency and wherein the triggering signal is communicated from a body camera or a vehicle camera only to the other nearby body camera(s) or the other nearby vehicle camera(s) associated with that agency and to other nearby body camera(s) or the other nearby vehicle camera(s) associated with a different agency.

* * * * *